United States Patent
Dodge

(10) Patent No.: US 8,959,616 B2
(45) Date of Patent: Feb. 17, 2015

(54) SYSTEM AND METHOD FOR ACCESSING A RESTRICTED OBJECT

(71) Applicant: QNX Software Systems Limited, Kanata (CA)

(72) Inventor: Danny Thomas Dodge, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 41 days.

(21) Appl. No.: 13/660,359

(22) Filed: Oct. 25, 2012

(65) Prior Publication Data
US 2014/0123272 A1    May 1, 2014

(51) Int. Cl.
  *G06F 7/04* (2006.01)
  *G06F 12/14* (2006.01)
  *G06F 17/30* (2006.01)

(52) U.S. Cl.
  USPC ............ 726/17; 726/1; 726/2; 726/4; 726/21; 726/27

(58) Field of Classification Search
  USPC .................................................. 707/9; 726/2
  See application file for complete search history.

(56) References Cited

U.S. PATENT DOCUMENTS

| | | | |
|---|---|---|---|
| 7,665,143 B2 * | 2/2010 | Havens et al. | 726/26 |
| 7,925,693 B2 * | 4/2011 | Swander et al. | 709/203 |
| 8,205,077 B2 * | 6/2012 | Noda et al. | 713/165 |
| 2006/0224590 A1 * | 10/2006 | Boozer et al. | 707/9 |
| 2006/0259487 A1 * | 11/2006 | Havens et al. | 707/9 |
| 2007/0043943 A1 * | 2/2007 | Peretti | 713/167 |
| 2009/0006847 A1 * | 1/2009 | Abzarian et al. | 713/164 |
| 2009/0328129 A1 * | 12/2009 | Desai et al. | 726/1 |
| 2011/0023082 A1 * | 1/2011 | Narasinghanallur et al. | 726/1 |
| 2011/0030045 A1 * | 2/2011 | Beauregard et al. | 726/9 |
| 2011/0296502 A1 * | 12/2011 | Peretti | 726/4 |

OTHER PUBLICATIONS

European Search Report from corresponding EP application No. 12191707.4 dated Feb. 7, 2013.
Chapter 13: "Protection" In: Silberschatz, Galvin—"Operating Systems Concepts" 1994.

* cited by examiner

*Primary Examiner* — Dede Zecher
*Assistant Examiner* — Trang Doan
(74) *Attorney, Agent, or Firm* — Gowling Lafleur Henderson LLP

(57) ABSTRACT

A system and method wherein an intermediary process provides access to a restricted object associated with a source process on behalf of a destination process. The intermediary process may be a trusted process that is available as a service to other processes on the computing platform. The intermediary process may assume one or more privileges associated with the source process whereby the restricted object may be accessed by the intermediary process on behalf of the destination process. Secure access to the restricted object and the risk of malicious exploitation are mitigated since the intermediary process is a trusted service that is known to provide specific functionality.

18 Claims, 3 Drawing Sheets

SYSTEM AND METHOD FOR ACCESSING A RESTRICTED OBJECT

BACKGROUND

1. Technical Field

The present disclosure relates to the field of computer executable processes and their ability to interact with restricted objects. In particular, to a system and method for accessing a restricted object.

2. Related Art

Computing platform operating systems may include mechanisms to enable or to restrict particular actions being taken by processes executing on a computing platform. These mechanisms may take the form of one or more abilities that can be assigned or denied to individual processes. The collection of abilities assigned to a process may be referred to as a set of privileges.

In multi-user operating systems, one or more privileges may be associated with each user (a.k.a. user-id). Each executing process may be given one or more privileges that are associated with the owner (e.g. user-id) of the process. A process owned by a particular user-id may create a restricted object that is inaccessible to processes owned by other user-ids. Creating the restricted object that is inaccessible to processes owned by other user-ids may be utilized to enhance security on the computing platform. Some applications may require other processes associated with different user-ids to access the restricted object. Granting another process the one or more privileges required to access the restricted object may compromise security.

BRIEF DESCRIPTION OF DRAWINGS

The disclosure may be better understood with reference to the following drawings and description. The components in the figures are not necessarily to scale, emphasis instead being placed upon illustrating the principles of the disclosure.

Moreover, in the figures, like referenced numerals designate corresponding parts throughout the different views.

DETAILED DESCRIPTION

Figure 1A:
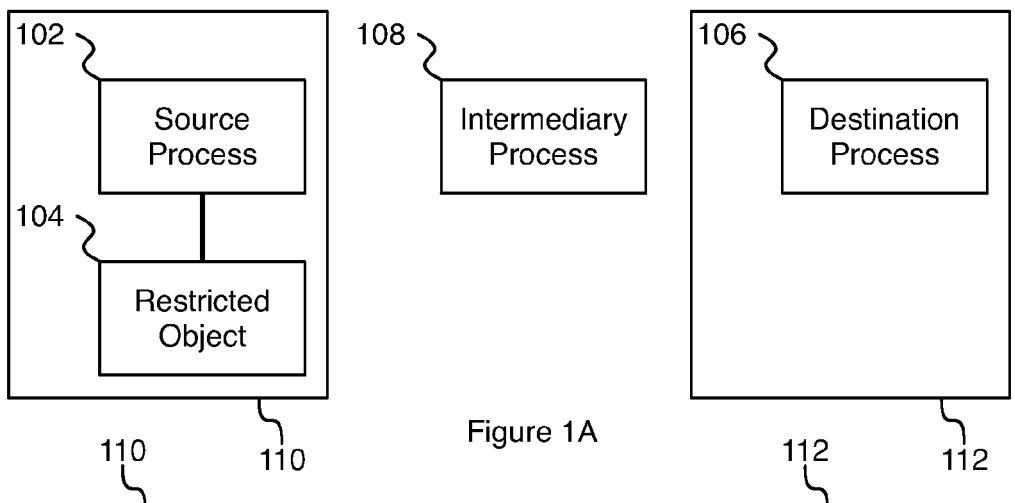
FIGS. 1A, 1B and 1C are schematic representations of processes, objects and their relationships.

In accordance with an aspect of the present disclosure there is provided a computer implemented method for an intermediary process to provide access to a restricted object associated with a source process on behalf of a destination process comprising: modifying one or more privileges associated with the intermediary process to match one or more privileges associated with the source process; obtaining a reference to the restricted object associated with the source process; modifying one or more privileges associated with the intermediary process to match one or more privileges associated with the destination process; and creating an output object.

In accordance with an aspect of the present disclosure there is provided a system for accessing a restricted object where an intermediary process provides access to the restricted object associated with a source process on behalf of a destination process, the system comprising: a processor; a memory coupled to the processor containing instructions, executable by the processor, for performing modifying one or more privileges associated with the intermediary process to match one or more privileges associated with the source process; obtaining a reference to the restricted object associated with the source process; modifying one or more privileges associated with the intermediary process to match one or more privileges associated with the destination process; and creating an output object.

On a computing platform a privilege is a permission to perform an action (a.k.a. an ability). In multi-user operating systems a set of privileges may be associated with each user identity (user-id) on the system; the set of privileges containing one or more abilities that are assigned to the user-id. Alternatively or in addition, a set of privileges may be associated with each of one or more group identities (group-id) and in turn with each user-id that is a member of each group-id. Some systems may include one or more user-ids that are designated as system administrator users (a.k.a. root user, root, or sys admin) that may be given all possible privileges.

Each process executing on the computing platform may be assigned one or more privileges. The one or more privileges assigned to a process may be based on the set of privileges associated with the user-id of the owner of the process. The process may be assigned the set of privileges associated with the owner of the process at the time the process is created. The process may create an object, or restricted object, that is assigned one or more permissions that correspond to the privileges associated with the process. For example, a source process may create a file in a file system that has permissions for reading the file only by the source process.

Processes that execute the core functions (a.k.a. kernel) of the operating systems or that are created during the start-up phase (a.k.a. boot sequence) of operation may be owned by a system administrator user-id that in UNIX®-like (UNIX is a registered trademark of The Open Group of San Francisco, Calif.) operating systems is referred to as 'root'. Processes that are owned by root can be said to run as root. Processes that run as root may be omnipotent (e.g. have all possible privileges). While using processes that are omnipotent facilitates the execution of the core operating system and start-up functions, it may also leave the system vulnerable to forms of attack that exploit the omnipotence of these processes.

Herein are described systems and methods wherein an intermediary process provides access to the restricted object associated with the source process on behalf of a destination process. The intermediary process may be a trusted process that is available as a service to other processes on the computing platform. The intermediary process may assume one or more privileges associated with the source process whereby the restricted object may be accessed by the intermediary process on behalf of the destination process. Secure access to the restricted object and the risk of malicious exploitation are mitigated since the intermediary process is a trusted service that is known to provide specific functionality. Neither the source process nor the destination process needs to have system administration privileges.

An example source process and destination process may include an application, a service, an agent and a device driver. Example restricted objects may include a file, a stream and a pipe that may be part of a UNIX®-like operating system. In an illustrative example, there is a source process with an associated file, or restricted object, and it is desired to provide a destination process with a copy of the file, or a portion of the file, associated with the source process. The destination process may utilize the intermediary process to access the file.

Figure 1B:
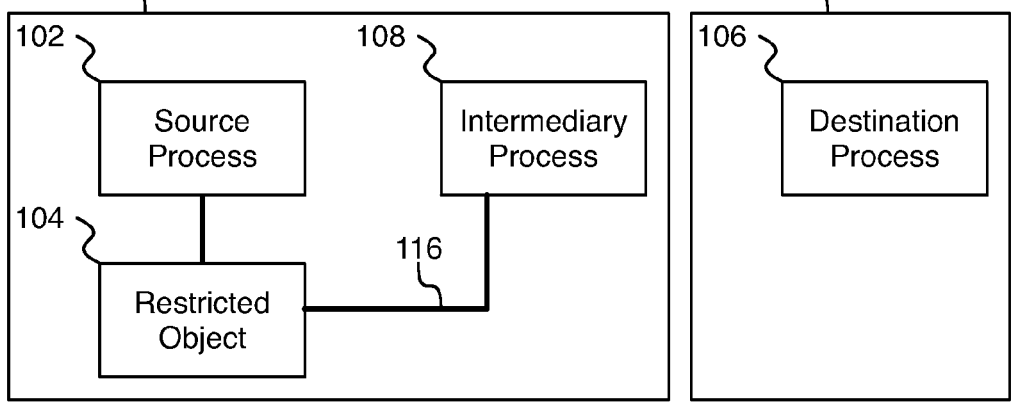
Figure 1C:
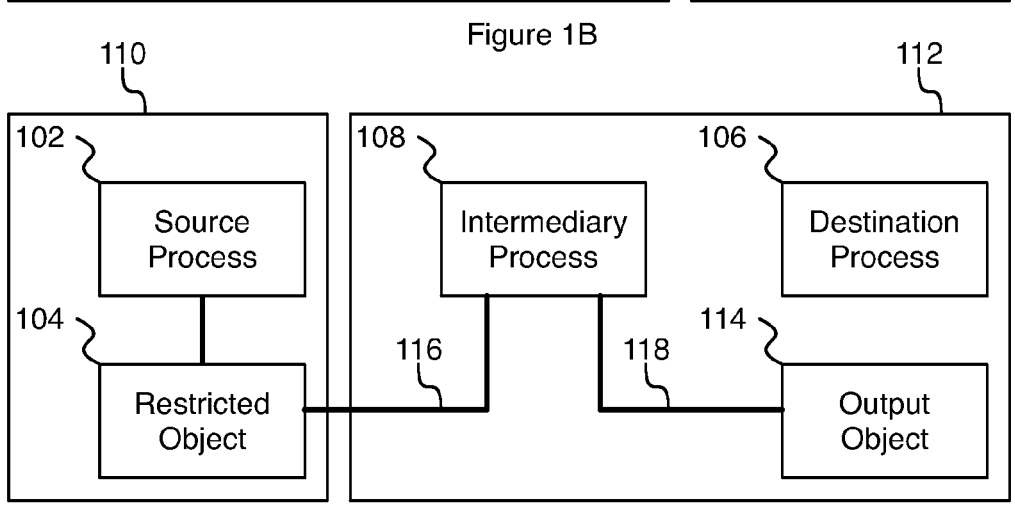

FIG. 1A, 1B and 1C are schematic representations of processes, objects and their relationships that can be operated on by a system for accessing a restricted object. FIG. 1A illustrates a source process 102, a destination process 106 and an intermediary process 108. The source process 102 may create a restricted object 104 that may have one or more permissions that correspond to privileges associated with the source process 102. The source process 102 and the restricted object 104 may belong to a common domain 110 as a result of having one or more source privileges or corresponding permissions in common. The destination process 106 may have associated one or more different privileges and belong to another domain 112. The destination process 106 may utilize the intermediary process 108 to access the restricted object 104.

FIG. 1B illustrates modifying one or more privileges associated with the intermediary process 108 to match one or more privileges associated with the source process 102. The intermediary process 108, the source process 102 and the restricted object 104 may share one or more source privileges, or corresponding permissions, and belong to a common domain 110. In one embodiment, one or more privileges associated with the source process 102 may be discovered and used to set one or more privileges associated with the intermediary process 108 to be the same as the discovered one or more privileges. Privileges associated with a source process 102 or restricted object 104 may, for example, be discovered with UNIX®-like commands including ls and ps. The intermediary process 108 may obtain a reference 116 to the restricted object 104 provided that the one or more privileges allow access in order to obtain the reference 116.

When the restricted object 104 is a file, the intermediary process 108 opens the file and obtains a reference 116 where the reference 116 may be a file identifier commonly referred to as a FD. A UNIX®-like operating system may check the privileges of the intermediary process 108 when executing the file open operation to verify that the privileges correspond to permissions associated with the file. A process with the proper privileges to open the file may be provided a valid file identifier.

FIG. 1C illustrates modifying one or more privileges associated with the intermediary process 108 to match one or more privileges associated with the destination process 106. The intermediary process 108 and the destination process 106 may share one or more privileges and belong to a common domain 112. In one embodiment, one or more privileges associated with the destination process 106 may be discovered and used to set one or more privileges associated with the intermediary process 108 to be the same as the discovered one or more privileges. Discovery of the privileges associated with the destination process 106 may be determined in the same way as described above with reference to the source process 102. The intermediary process 108 may create an output object 114 that may share one or more destination permissions that correspond to the privileges of the intermediary process 108 and the destination process 106. The destination process 106 may access the output object 114 created by the intermediary process 108. The intermediary process 108 may have references, 118 and 116, to the output object 114 and the restricted object 104 respectively. In an alternative embodiment, the output object 114 has been created by another process, for example the destination process 106, and the intermediary process 108 may obtain a reference 118 to the output object 114.

When the restricted object 104 is a file, the intermediary process 108 may have a valid file identifier that references 116 the restricted object 104. A UNIX®-like operating system may allow the intermediary process 108 to access the file, or restricted object 104, using the file identifier even though the intermediary process 108 may have subsequently modified one or more privileges to match one or more privileges associated with the destination process 106. When the output object 114 is a file, the intermediary process 108 may obtain a file identifier for the output object 114. The intermediary process 108 may perform a file copy of all, or a portion, of the contents of the restricted object 104 and write the contents to the output object 114.

The source process 102 and the destination process 106 may not have system administration privileges. A controller process (not illustrated) may have one or more privileges that match both the source process 102 and the destination process 106 where the controller process may control the intermediary process 108. The controller process may provide the one or more privileges to the intermediary process 108 to access both the restricted object 104 and the output object 114. The controller process may have system administration privileges. The intermediary process 108 provides access to the restricted object 104 and the output object 114 on behalf of the controller process without itself having to have system administration privileges.

Figure 3:
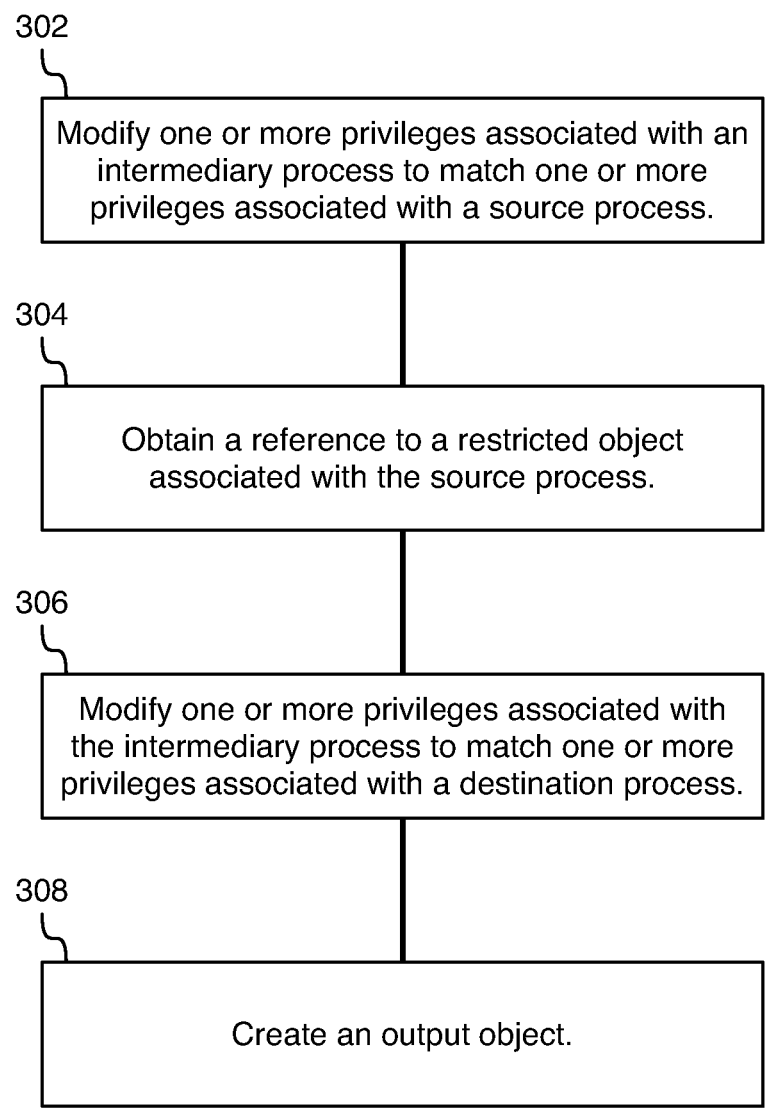
FIG. 3 is a flow diagram representing the logic in a method for accessing a restricted object.

FIG. 3 is a flow diagram representing the logic in a method for accessing a restricted object. The computer executable intermediary process 108 provides access to the restricted object 104 associated with the source process on behalf of the destination process 106. One or more privileges associated with the intermediary process may be modified to match one or more privileges associated with the source process 302. The intermediary process may have one or more privileges that match the source process and corresponding permissions of the restricted object. The intermediary process may obtain a reference 116 to the restricted object associated with the source process 304. One or more privileges associated with the intermediary process may be modified to match one or more privileges associated with the destination process 306. The intermediary process may create the output object 308. Creating the output object 308 may include copying the contents, or a portion of the contents of the restricted object 104 to the output object 114. Alternatively, the output object 114 may be created by another process and the contents, or a portion of the contents, of the restricted object 104 may be copied to the output object 114 by the intermediary process 108.

Figure 2:
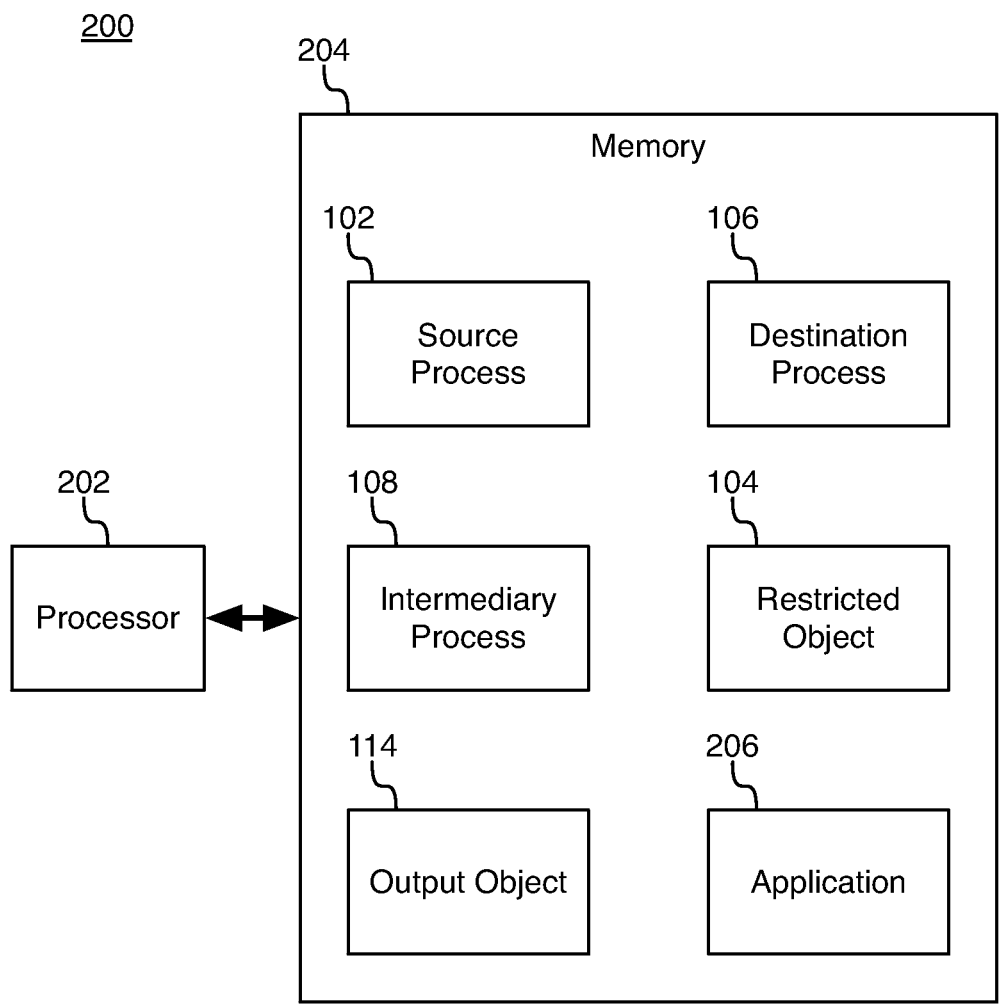
FIG. 2 is a schematic representation of components of a system for accessing a restricted object.

FIG. 2 is a schematic representation of components of a system for accessing a restricted object. The system 200 may comprise a processor 202 and memory 204. The processor 202 may comprise a single processor or multiple processors that may be disposed on a single chip, on multiple devices or distributed over more than one system. The processor 202 may be hardware that executes computer executable instructions or computer code embodied in the memory 204 or in other memory to perform one or more features of the system. The processor 202 may include a general processor, a central processing unit, a graphics processing unit, an application specific integrated circuit (ASIC), a digital signal processor, a field programmable gate array (FPGA), a digital circuit, an analog circuit, a microcontroller, any other type of processor, or any combination thereof.

The memory 204 may comprise a device for storing and retrieving data or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the source process 102, the destination process 104, the intermediary process 108, the restricted object 104, the output object 114 and/or any other application 206. The computer code may include instructions executable with the processor 202. The computer code may be written in any computer language, such as C, C++, assembly language, channel program code, and/or any combination of computer languages. The memory 204 may store information in data structures.

All of the disclosure, regardless of the particular implementation described, is exemplary in nature, rather than limiting. The system 200 may include more, fewer, or different components than illustrated in FIG. 2. Furthermore, each one of the components of system 200 may include more, fewer, or different elements than is illustrated in FIG. 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a central processing unit ("CPU").

A default set of privileges may be associated with each of one or more user-ids. The operating system may comprise a processor creator that is part of the kernel. The kernel may create one or more processes over time. Each created process may be owned by a user-id and may be assigned a default set of privileges associated with the user-id. The operating system may provide a means for receiving a request to modify the privileges of a process via, for example, a procedure call (a.k.a. a system call) that may be embodied in a linking library such as, for example, a 'C' library. The procedure call may be invoked by a process with the object of the call being the process itself. Alternatively or in addition, the procedure call may be invoked by a process other than the process that is the object of the call. The process that is the object of the request to modify may be identified by, for example, including in the request to modify a process identifier (pid) of the process. When the request to modify is received, the kernel may modify the set of privileges assigned to the process. The process creator may further create one or more child processes on behalf of the process. Each child process may be assigned the set of privileges assigned to its parent process at the time of the child process' creation.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A computer implemented method executed by a processor for an intermediary process to provide access to a restricted object associated with a source process on behalf of a destination process comprising:
    modifying one or more privileges associated with the intermediary process to match a first set of privileges associated with the source process;
    obtaining a reference to the restricted object associated with the source process;
    modifying one or more privileges associated with the intermediary process to match the second privileges associated with the destination process; and
    creating an output object in a non-transitory storage memory by copying at least a portion of contents of the restricted object to the output object, the output object having the second set privileges associated with the destination process,
    wherein the destination process does not have the first set of privileges to access the restricted object.

2. The computer implemented method of claim 1, where the restricted object is only accessible to a process that has one or more privileges that match the first set of privileges of the source process with which the restricted object is associated.

3. The computer implemented method of claim 1, where the restricted object and the output object are each files in a file system.

4. The computer implemented method of claim 1, where neither the source process nor the destination process has system administration privileges.

5. The computer implemented method of claim 1, where each of the source process and the destination process comprise any one of an application, a service, an agent, and a device driver.

6. The computer implemented method of claim 1, where the one or more privileges associated with the intermediary process include any one or more of a user identifier and a group identifier.

7. The computer implemented method of claim 3, where the reference to the restricted object is a file identifier.

8. The computer implemented method of claim 1, where modifying the one or more privileges associated with the intermediary process to match the first set of privileges associated with the source process further comprising:
    discovering first set of privileges associated with the source process;
    setting one or more privileges associated with the intermediary process to be the same as the discovered first set of privileges.

9. The computer implemented method of claim 1, where modifying the one or more privileges associated with the intermediary process to match the second set of privileges associated with the destination process further comprising:
    discovering the second set of privileges associated with the destination process;
    setting one or more privileges associated with the intermediary process to be the same as the discovered second set of privileges.

10. A system for accessing a restricted object where an intermediary process provides access to the restricted object associated with a source process on behalf of a destination process, the system comprising:
- a memory containing instructions; and
- a processor coupled to the memory for executing the instructions to perform:
- modifying one or more privileges associated with the intermediary process to match a first set of privileges associated with the source process;
- obtaining a reference to the restricted object associated with the source process;
- modifying one or more privileges associated with the intermediary process to match a second set of privileges associated with the destination process; and
- creating an output object in the memory by copying at least a portion of contents of the restricted object to the output object, the output object having the second set of privileges associated with the destination process,
- wherein the destination process does not have the first set of privileges to access the restricted object.

11. The system of claim 10, where the restricted object is only accessible to a process that has one or more privileges that match the first set of privileges of the source process with which the restricted object is associated.

12. The system of claim 10, where the restricted object and the output object are each files in a file system.

13. The system of claim 10, where neither the source process nor the destination process has system administration privileges.

14. The system of claim 10, where each of the source process and the destination process comprise any one of an application, a service, an agent, and a device driver.

15. The system of claim 10, where the one or more privileges associated with the intermediary process include any one or more of a user identifier and a group identifier.

16. The system of claim 12, where the reference to the restricted object is a file identifier.

17. The system of claim 10, where modifying the one or more privileges associated with the intermediary process to match the first set of privileges associated with the source process further comprising:
- discovering first set of privileges associated with the source process; and
- setting one or more privileges associated with the intermediary process to be the same as the discovered first set of privileges.

18. The system of claim 10, where modifying the one or more privileges associated with the intermediary process to match the first set of privileges associated with the destination process further comprising:
- discovering the second set of privileges associated with the destination process; and
- setting one or more privileges associated the with intermediary process to be the same as the discovered second set of privileges.

\* \* \* \* \*